US012780995B2

(12) United States Patent
Olsson et al.

(10) Patent No.: US 12,780,995 B2
(45) Date of Patent: Nov. 3, 2026

(54) PROCESS FOR PRODUCING THERMALLY STABILIZED LIGNIN

(71) Applicant: Stora Enso OYJ, Helsinki (FI)

(72) Inventors: Vilhelm Olsson, Täby (SE); Dimitri Areskogh, Bromma (SE); Stephan Walter, Tyresö (SE)

(73) Assignee: Stora Enso OYJ, Helsinki (FI)

( * ) Notice: Subject to any disclaimer, the term of this patent is extended or adjusted under 35 U.S.C. 154(b) by 839 days.

(21) Appl. No.: 18/000,869

(22) PCT Filed: Jun. 10, 2021

(86) PCT No.: PCT/IB2021/055102
§ 371 (c)(1),
(2) Date: Dec. 6, 2022

(87) PCT Pub. No.: WO2021/250603
PCT Pub. Date: Dec. 16, 2021

(65) Prior Publication Data
US 2023/0235128 A1 Jul. 27, 2023

(30) Foreign Application Priority Data
Jun. 11, 2020 (SE) .................................... 2050698-6

(51) Int. Cl.
*C08H 7/00* (2011.01)
*B29B 9/02* (2006.01)
*B29B 9/08* (2006.01)
*B29B 13/02* (2006.01)
*B29B 13/10* (2006.01)

(52) U.S. Cl.
CPC ................ *C08H 6/00* (2013.01); *B29B 9/02* (2013.01); *B29B 9/08* (2013.01); *B29B 13/02* (2013.01); *B29B 13/10* (2013.01)

(58) Field of Classification Search
CPC .... C08H 6/00; B29B 9/02; B29B 9/08; B29B 13/02; B29B 13/10
USPC .......................................................... 530/500
See application file for complete search history.

(56) References Cited

U.S. PATENT DOCUMENTS

| | | | |
|---|---|---|---|
| 6,099,990 | A | 8/2000 | Denton, III et al. |
| 2014/0186627 | A1 | 7/2014 | Pu et al. |
| 2015/0068112 | A1 | 3/2015 | Varvemaa et al. |
| 2016/0230099 | A1 | 8/2016 | Hilli et al. |

FOREIGN PATENT DOCUMENTS

| | | | |
|---|---|---|---|
| CN | 104204103 | A | 12/2014 |
| CN | 106966390 | A | 7/2017 |
| EP | 3053929 | A1 | 8/2016 |
| JP | 2011178851 | A | 9/2011 |
| JP | 2015067514 | A | 4/2015 |
| WO | 2006031175 | A1 | 3/2006 |
| WO | 2020000094 | A1 | 1/2020 |
| WO | 2020183383 | A1 | 9/2020 |
| WO | 2021250603 | A1 | 12/2021 |

OTHER PUBLICATIONS

Picchio, et al. "Pellet Production from Woody and Non-Woody Feedstocks: A Review on Biomass Quality Evaluation", Energies 2020, 13, 2937: doi: 10.3390/en13112937.
Extended European Search Report from corresponding European application No. 21821729.9, dated Apr. 10, 2024.
International Search Report from corresponding PCT application No. PCT/IB2021/055102, mailed on Sep. 3, 2021.
Brodin, Ida et al., Oxidative stabilisation of kraft lignin for carbon fibre production, Holzforschung, vol. 66, pp. 141-147, 2012.
P.O. Ibeh et al., Activated carbon monoliths from lignocellulosic biomass waste for electrochemical applications, Journal of the Taiwan Institute of Chemical Engineers, 97, (2019), 480-488.
Köhnke, Janea et al., Comparison of Four Technical Lignins as a Resource for Electrically Conductive Carbon Particles, BioResources, 14(1), 1091-1109, 2019.
Ragan, Steve et al., Activated Carbon From Renewable Resources—Lignin, Cellulose Chemistry and Technology, 45 (7-8), 527-531 (2011).
Steve Ragan et al., Activated Carbon from Renewable Resources—Lignin, Cellulose Chem. Technol, 45, (7-8), 527-531, 2011. (5 pages).
Examination Report No. 1 from corresponding Australian application No. 2021289209, dated Apr. 24, 2026. (3 pages).

*Primary Examiner* — David T Karst
(74) *Attorney, Agent, or Firm* — Greer, Burns & Crain, Ltd.

(57) ABSTRACT

The present invention is directed to a process for the production of thermally stabilized agglomerated lignin, which avoids melting and/or significant foaming during subsequent thermal processing. The process comprises the steps of providing agglomerated lignin and heating the agglomerated lignin to obtain thermally stabilized agglomerated lignin. The thermally stabilized lignin can be further processed to a carbon enriched material.

9 Claims, No Drawings

PROCESS FOR PRODUCING THERMALLY STABILIZED LIGNIN

This application is a U.S. National Phase under 35 U.S.C. § 371 of International Application No. PCT/IB2021/055102 filed Jun. 10, 2021, which claims priority under 35 U.S.C. §§ 119 and 365 to Swedish Application No. 2050698-6 filed Jun. 11, 2020.

FIELD OF THE INVENTION

The present invention is directed to production of thermally stabilized lignin, which avoids agglomeration and/or significant foaming during subsequent thermal processing. The thermally stabilized lignin can be further processed to a carbon enriched material.

BACKGROUND

Carbon enriched materials can be used for various end-uses, such as bio-chars, activated carbons and electrode materials.

In conventional processes of converting biomass into carbon-enriched intermediates, powders are often avoided. Direct use of lignin, as a fine powder, is not suitable since it exhibits undesired thermoplastic behaviour.

During thermal conversion of lignin powder into carbon-enriched intermediates, lignin undergoes plastic deformation/melting, aggressive swelling and foaming. Combined with the strong tendency for dust formation during handling, this severely limits processability of lignin in industrially relevant scale, in terms of equipment dimensioning and process throughput as well as need of intermediate processing.

It would be desirable to use lignin as an alternative to fossil-based carbon-containing materials. Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

However, to use lignin as a raw material for economical production of carbon enriched materials, such as bio-chars, activated carbons and electrode materials, it would be necessary to avoid that the lignin undergoes plastic deformation/melting, aggressive swelling and foaming upon heating.

U.S. Pat. No. 6,099,990 describes a method of fabricating a carbon material, which involves the steps of mixing a lignin powder with a salt and then heating the mixture in several steps, involving a carbonization step. According to U.S. Pat. No. 6,099,990, foaming is reduced during heating. However, the salts used are expensive and not compatible with a large-scale process. In addition, the salts will remain in the carbon material unless removed by a washing step.

Methods of reducing melting of lignin during heating involve modifying lignin powder with maleic acid as described in JP2015067514, and hydrothermal carbonization treatments of lignin solutions prior to carbonization as described in US2016230099 and JP2011178851.

However, there remains a need for a simple and scalable method of obtaining lignin that can be heat treated with retained shape and dimension to obtain granular carbon.

SUMMARY OF THE INVENTION

It has surprisingly been found that lignin which has undergone agglomeration into macroscopic particles can be thermally stabilized with retained shape and dimension, avoiding melting/swelling deformation. This stabilized lignin can be further processed into carbon enriched materials for various end-uses, such as bio-chars and activated carbons. Furthermore, it has been found that a previously agglomerated lignin which has been thermally stabilized will continue to retain its dimensional integrity during further processing into carbon-enriched products.

The present invention is directed to a process to produce thermally stabilized agglomerated lignin, said agglomerates comprising less than 5 wt-% of components other than lignin and water, said process comprising the steps of a) providing agglomerated lignin having a particle size distribution such that at least 80 wt-% of the agglomerates have a diameter within the range of from 0.2 mm to 5.0 mm;

b) heating the agglomerated lignin to a temperature in the range of from 140 to 250° C. for a period of at least 1.5 hours, to obtain thermally stabilized agglomerated lignin.

Preferably the particle size distribution of the agglomerated lignin obtained in step b) is such that at least 80 wt-% of the agglomerates have a diameter within the range of from 0.2 mm to 5.0 mm.

Preferably, the agglomerated lignin used in step a) is produced by i providing lignin in the form of a powder, wherein the particle size distribution of the lignin in the form of a powder is such that at least 80 wt-% of the particles have a diameter less than 0.2 mm and a moisture content of less than 45 wt-%;

ii. compacting the lignin powder of step i);

iii. crushing the compacted lignin obtained in step ii);

iv. optionally sieving the compacted lignin obtained in step iii) to remove particles having a particle diameter below 100 μm, thereby obtaining the agglomerated lignin having a particle size distribution such that at least 80 wt-% of the particles have a diameter within the range of from 0.2 mm to 5.0 mm.

Preferably, the product obtained in step iii is subjected to sieving in accordance with step iv. Preferably, in step iv, the sieving is carried out such that the agglomerated lignin obtained has a particle size distribution such that at least 80 wt-% of the particles have a diameter in the range of from 0.5 mm to 2.0 mm, more preferably 0.5 mm to 1.5 mm.

The compaction may be carried out without addition of any additives to the material to be compacted. In the context of the present invention, an additive is a substance that is added to the process to improve adhesion between the lignin particles. Thus, additives are substances that are added, but that are not present in the lignin that is the starting material in step a). Thus, neither moisture, such as water, nor other components already present in the lignin that is the starting material in step i), are considered additives in the context of the present invention.

The present invention is also directed to a thermally stabilized agglomerated lignin with a particle size distribution such that at least 80 wt-% of the agglomerates have a diameter in the range of from 0.2 mm to 5.0 mm, wherein said thermally stabilized lignin can be subjected to heating at a temperature of from 140 to 250° C. without melting.

After thermal stabilization, the agglomerated lignin particles will not melt or fuse during subsequent heating.

DETAILED DESCRIPTION

It is intended throughout the present description that the expression “lignin” embraces any kind of lignin, e.g. lignin originated from hardwood, softwood or annular plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%, more preferably at least 98%, most preferably at least 99%, 99.5% or 99.9%. Thus, the lignin used according to the process of the present invention preferably contains less than 10%, preferably less than 5%, more preferably less than 2% impurities. The lignin may be separated from the black liquor by using the process disclosed in WO2006031175.

In the context of the present invention, the diameter of a particle is the equivalent spherical diameter of the particle, if the particle is not spherical. The equivalent spherical diameter is the diameter of a sphere of equivalent volume.

Preferably, the agglomerated lignin is prepared by a process comprising the steps of i. providing lignin in the form of a powder, wherein the particle size distribution of the lignin in the form of a powder is such that at least 80 wt-% of the particles have a diameter less than 0.2 mm and a moisture content of less than 45 wt-%;
ii. compacting the lignin powder of step i);
iii. crushing the compacted lignin obtained in step ii);
iv. optionally sieving the compacted lignin obtained in step iii) to remove particles having a particle diameter below 100 μm, thereby obtaining the agglomerated lignin having a particle size distribution such that at least 80 wt-% of the particles have a diameter in the range of 0.2 mm to 5.0 mm, preferably from 0.2 mm to 2.0 mm, more preferably from 0.5 to 1.5 mm.

Preferably, the lignin in powder form is dried before compaction. The drying of the lignin is carried out by methods and equipment known in the art. The lignin in powder form used in step i) has a moisture content of less than 45 wt-%. Preferably, the moisture content of the lignin before compaction according to the present invention is less than 25 wt-%, preferably less than 10 wt-%, more preferably less than 8 wt-%. In one embodiment, the moisture content of the lignin before compaction according to the present invention is at least 1 wt-%, such as at least 5 wt-%. The temperature during the drying is preferably in the range of from 80° C. to 160° C., more preferably in the range of from 100° C. to 120° C.

The lignin powder obtained after drying has a wide particle size distribution ranging from 1 μm to 2 mm which is significantly skewed towards the micrometer range, meaning that a significant proportion of the particles has a diameter in the range of 1 to 200 micrometers.

The compaction of the lignin is preferably carried out by roll compaction.

The roll compaction of lignin can be achieved by a roller compactor to agglomerate the lignin particles.

In the compaction step, an intermediate product is generated. Here, the fine lignin powder is usually fed through a hopper and conveyed by means of a horizontal or vertical feeding screw into the compaction zone where the material is compacted into flakes by compaction rollers with a defined gap. By controlling the feeding screw speed, the pressure development in the compaction zone, flakes with uniform density can be obtained. The pressure development in the compaction zone can preferably be monitored and controlled by the rotational speed of the compaction rolls. As the powder is dragged between the rollers, it enters what is termed as the nip area where the density of the material is increased and the powder is converted into a flake or ribbon. The rolls used have cavities. The depth of each cavity used in the roll compaction is from 0.1 mm to 10 mm, preferably from 1 mm to 8 mm, more preferably from 1 mm to 5 mm or from 1 mm to 3 mm. The specific press force exerted during the compaction may vary depending on the equipment used for compaction, but may be in the range of from 1 kN/cm to 100 KN/cm. Equipment suitable for carrying out the compaction are known in the art.

After compaction, crushing is preferably carried out.

In the crushing step, the intermediate product from the compaction step is subjected to crushing or grinding, such as by means of rotary granulator, cage mill, beater mill, hammer mill or crusher mill and/or combinations thereof. During this step, a further intermediate product is generated.

After crushing, the crushed material is preferably subjected to a sieving step, to remove fine material. In addition, large material, such as agglomerates having a diameter larger than 5.0 mm, may be removed and/or recirculated back to the crushing step.

In the sieving step, the intermediate product from the crushing step is screened by means of physical fractionation such as sieving, also referred to as screening, to obtain a final product which is agglomerated lignin with a defined particle size distribution set by the porosity of the sieves or screens in this step. The sieve or screen is selected such that most particles having a diameter below 100 (or 500) μm pass through the screen and are rejected and preferably returned to the compaction step, whereas most particles having a diameter above 100 (or 500) μm are retained and subjected to the subsequent heating step of the process according to the present invention. The sieving may be carried out in more than one step, i.e. the sieving can be carried out such that the crushed material from the crushing step passes sequentially through more than one screen or sieve.

In one embodiment of the roll compaction, the rolls configuration is such that the first roll has an annual rim in such configuration so that the powder in the nip region is sealed in the axial direction along the roller surface.

In one embodiment, the roll configuration is such that the nip region is sealed in the axial direction along the roller surface with a static plate. By ensuring that the nip region is sealed, loss of powder at the axial ends of the rollers is minimized as compared to entirely cylindrical nip rollers.

It is particularly beneficial to carry out the compaction according to the present invention on a material that is essentially only lignin, i.e. in the absence of additives, since that makes the use of the compacted product easier, due to the absence of binders or other components that could otherwise negatively influence the application in which the compacted, crushed and optionally sieved lignin is supposed to be used.

Due to the compaction of the lignin powder during preparation of agglomerated lignin, the bulk density of lignin will increase as pressure is applied to the lignin powder. This means that the agglomerated lignin will have a higher bulk density than the lignin powder. More compact lignin particles may be beneficial during subsequent processing to carbon enriched materials, as compact lignin particles have been found to retain its shape and dimensions with no melting or swelling. The agglomerated lignin particles will also have a relatively higher hardness after compaction. Hard particles are advantageous during subsequent processing as they can resist physical impact during processing. Further, when using hard, compacted particles processing problems that might arise due to the presence of lignin dust on the surface of the particles are avoided. This is of particular importance in a large-scale process since dust can form explosive mixtures with air and also cause blockings inside processing equipment.

The agglomerated lignin preferably has a bulk density in the range of from 0.5 g/cm$^3$ to 0.7 g/cm$^3$, more preferably from 0.5 g/cm$^3$ to 0.6 g/cm$^3$. The lignin powder, prior to agglomeration, preferably has a bulk density in the range of from 0.3 g/cm$^3$ to 0.4 g/cm$^3$. The thermally stabilized agglomerated lignin preferably also has a bulk density in the range of from 0.5 g/cm$^3$ to 0.7 g/cm$^3$, more preferably from 0.5 g/cm$^3$ to 0.6 g/cm$^3$. The thermal stabilization might lead to a slight increase or decrease in bulk density of the lignin. The bulk density will however preferably remain within the same range as prior to the thermal stabilization.

The agglomerated lignin has a particle size distribution such that at least 80 wt-% of the particles have a diameter in the range of from 0.2 mm to 5.0 mm. Preferably, the particle size distribution is such that at least 90 wt-%, more preferably at least 95 wt-%, of the particles have a diameter in the range of from 0.2 mm to 5.0 mm. More preferably, at least 90 wt-%, more preferably at least 95 wt-%, of the particles have a diameter in the range of from 0.5 mm to 2 mm.

The step of heating the agglomerated lignin to produce thermally stabilized agglomerated lignin can be carried out continuously or in batch mode. The heating can be carried out using methods known in the art and can be carried out in the presence of air or completely or partially under inert gas. Preferably, the heating is carried out in a rotary kiln, moving bed furnace or rotary hearth furnace.

The heating to produce thermally stabilized agglomerated lignin is carried out at such that the agglomerated lignin is heated to a temperature in the range of from 140 to 250° C., preferably from 180 to 230° C. The heating is carried out for at least 1.5 hours, i.e. the residence time of the agglomerated lignin inside the equipment used for the heating is at least 1.5 hours. Preferably, the heating is carried for less than 12 hours. The heating may be carried out at the same temperature throughout the entire heating stage or may be carried out at varying temperature, such as a stepwise increase of the temperature or using a temperature gradient. More preferably, the heating is carried out such that the agglomerated lignin is first heated to a temperature of from 140 to 175° C. for a period of at least one hour and subsequently heated to a temperature of from 175 to 250° C. for at least one hour.

By controlling and optimizing parameters such as temperature and time during the thermal stabilization process, thermally stabilized agglomerated lignin that retains its shape and dimensions with no fusing or swelling during subsequent processing can be obtained. The described process has an excellent compatibility with the typical process requirements for continuous production, using rotary kiln for example, due to mechanical stability of the agglomerated lignin and a relatively short residence time. This is of particular importance for achieving an economical large industry-scale process for producing carbon enriched materials.

The colour of the thermally stabilized agglomerated lignin is different from the colour of the agglomerated lignin prior to thermal stabilization. The colour can be determined for example by using a spectrophotometer and reported in accordance with the CIELAB colour space. In the CIELAB colour space, colour can be reported as lightness (L*), green-red (a*) and blue-yellow (b*) components. Preferably, the lightness (L*) of the surface of the thermally stabilized agglomerated lignin is in the range of from 37 to 39, preferably in the range of from 37 to 38. The lightness of the surface of the agglomerated lignin prior to thermal stabilization is above 44, such as in the range of from 44 to 52. Thus, the lightness of the agglomerated lignin decreases during thermal stabilization.

The thermally stabilized agglomerated lignin can be subjected to further heating steps.

EXAMPLES

Example 1

Lignin powder from the LignoBoost process was agglomerated by means of roller compaction into particles with a size distribution of 0.2-2 mm. The agglomerated lignin was heated slowly up to 200° C. and held for 12 h. During this process, the agglomerated lignin did not exhibit any melting behaviour and completely retained its original shape. Surprisingly it was found that the individual granules did not fuse together and remained free flowing. The material gradually darkened during the processing until it was completely black and free of smell.

Example 2

Lignin powder from the LignoBoost process was agglomerated by means of roller compaction, then crushed and sieved into particles with a size distribution of 0.5-1.5 mm.

The agglomerated lignin was placed inside a laboratory rotary furnace, heated to 160° C. using air-flow for 2 h, followed by heating up to 225° C. for 2 h. During this process, the agglomerated lignin did not exhibit any melting behaviour. Surprisingly it was found that the individual granules did not fuse together or to the reactor walls and remained free flowing. The material gradually darkened during the processing until it was completely black.

Example 3 (Comparative Example)

In this experiment, thermal conversion of conventional lignin powder was carried out.

Lignin powder from the LignoBoost process was heated slowly up to 200° C. and held for 12 h. After the heating, it was found that the lignin had melted/fused into a solid black cake free of smell. This experiment shows the importance of agglomeration of lignin powder prior to the thermal stabilization step.

Example 4

In this experiment, a larger-scale continuous thermal stabilization process was evaluated. Lignin powder from the LignoBoost process was agglomerated by means of roller compaction, then crushed and sieved into particles with a size distribution of 0.5-1.5 mm. The lignin had a bulk density of 0.60 g/cm$^3$. Thermal stabilization of the agglomerated lignin was performed in air in a rotary kiln, the feed rate was 3 kg/h. The temperature was ramped from 170° C. to 230° C. in different heating zones and the mean residence time in the rotary kiln was 2.5 hours.

The bulk density of the thermally stabilized agglomerated lignin was 0.66 g/cm$^3$, a slight increase compared to the agglomerated lignin prior to stabilization.

The colour of the samples was measured using a Konica Minolta CM-5 spectrophotometer. Samples were not pretreated. The measurement gave the colour in the metrics of the CIELAB colour space. The agglomerated kraft lignin used as a starting value had an L *-value of 49.4. After thermal stabilization, the L *-value was measured at six times during a time period of five days. The values ranged from 37.4 to 37.9.

Matt black agglomerates were obtained. The thermally stabilized lignin agglomerates were free-flowing and exhibited a low degree of melting during the stabilization step. The total feed of agglomerated lignin was 441 kg and the total output was 390 kg, giving an overall yield of 93%. The total time of the trial was 172 h. In all, this demonstrates that a large-scale process is possible.

In view of the above detailed description of the present invention, other modifications and variations will become apparent to those skilled in the art. However, it should be apparent that such other modifications and variations may be effected without departing from the spirit and scope of the invention.

The invention claimed is:

1. A process to produce thermally stabilized agglomerated lignin, said thermally stabilized agglomerated lignin comprising less than 5 wt-% of components other than lignin and water, said process comprising the steps of a) producing agglomerated lignin particles having a particle size distribution such that at least 80 wt-% of the agglomerated lignin particles have a diameter within a range of from 0.2 mm to 5.0 mm by:

i. providing lignin in a form of a powder, wherein a particle size distribution of the lignin in the form of the powder is such that at least 80 wt-% of the particles have a diameter less than 0.2 mm and a moisture content of less than 45 wt-%;

ii. compacting the lignin powder of step i); and iii. crushing the compacted lignin obtained in step ii) thereby obtaining the agglomerated lignin particles; and b) heating the agglomerated lignin particles to a temperature in a range of from 140 to 250° C. for a period of at least 1.5 hours, to obtain the thermally stabilized agglomerated lignin.

2. The process according to claim 1, wherein the agglomerated lignin particles have a moisture content of from 5 wt-% to 25 wt-% before the heating in step b).

3. The process according to claim 2, wherein the agglomerated lignin particles have a moisture content of from 5 wt-% to 10 wt-% before the heating in step b).

4. The process according to claim 1, wherein the lignin is kraft lignin.

5. The process according to claim 1, wherein the thermally stabilized agglomerated lignin has a bulk density in the range of from 0.5 g/cm$^3$ to 0.7 g/cm$^3$.

6. The process according to claim 1, wherein a CIELAB lightness (L*) of a surface of the thermally stabilized agglomerated lignin is in a range of from 37 to 39.

7. The process according to claim 1, wherein the particle size distribution of the thermally stabilized agglomerated lignin obtained in step b) is such that at least 80 wt-% of the thermally stabilized agglomerated lignin has a diameter in a range of from 0.2 mm to 5.0 mm.

8. The process according to claim 1, wherein the heating of the agglomerated lignin particles in step b) is performed by first heating the agglomerated lignin particles to a temperature of from 140 to 175° C. for a period of at least one hour and subsequently heating the agglomerated lignin particles to a temperature of from 175 to 250° C. for at least one hour.

9. The process according to claim 1, further comprising:

iv. sieving the compacted lignin obtained in step iii) to remove particles having a particle diameter below 100 μm.

* * * * *